United States Patent
Park et al.

(10) Patent No.: US 11,303,605 B2
(45) Date of Patent: Apr. 12, 2022

(54) DOMAIN NAME BASED VISIBILITY AND POLICY ENFORCEMENT IN A SEGMENTED NETWORK ENVIRONMENT

(71) Applicant: Illumio, Inc., Sunnyvale, CA (US)

(72) Inventors: Jaehong Park, San Jose, CA (US); Mukesh Gupta, Fremont, CA (US); Paul James Kirner, Palo Alto, CA (US); Anish Vinodkumar Desai, Palo Alto, CA (US); Daniel Richard Cook, San Jose, CA (US)

(73) Assignee: Illumio, Inc., Sunnyvale, CA (US)

( * ) Notice: Subject to any disclaimer, the term of this patent is extended or adjusted under 35 U.S.C. 154(b) by 275 days.

(21) Appl. No.: 16/248,707

(22) Filed: Jan. 15, 2019

(65) Prior Publication Data
US 2020/0228486 A1 Jul. 16, 2020

(51) Int. Cl.
*H04L 29/12* (2006.01)
*H04L 61/4511* (2022.01)
*H04L 29/06* (2006.01)

(52) U.S. Cl.
CPC .......... *H04L 61/1511* (2013.01); *H04L 63/02* (2013.01); *H04L 63/101* (2013.01); *H04L 63/20* (2013.01)

(58) Field of Classification Search
CPC ... H04L 61/1511; H04L 63/02; H04L 63/101; H04L 63/20
USPC .......................................................... 726/27
See application file for complete search history.

(56) References Cited

U.S. PATENT DOCUMENTS

| | | | |
|---|---|---|---|
| 8,321,588 B2 | 11/2012 | Richardson et al. | |
| 9,762,612 B1* | 9/2017 | Schiffman | H04L 61/1511 |
| 2004/0249939 A1* | 12/2004 | Amini | H04L 67/1023 |
| | | | 709/225 |
| 2011/0219067 A1* | 9/2011 | Bernosky | H04L 29/12066 |
| | | | 709/203 |

(Continued)

FOREIGN PATENT DOCUMENTS

WO WO 2016/160132 A1 10/2016
WO WO 2018/125989 A2 7/2018

OTHER PUBLICATIONS

Lison et al., "Neural reputation models learned from passive DNS data", doi: 10.1109/BigData.2017.8258361, 2017, pp. 3662-3671. (Year: 2017).*
Jin et al., "Proposal of an Adaptive Firewall System in Collaboration with Extended DNS" doi: 10.1109/SAINT.2011.40, 2011, pp. 222-225. (Year: 2011).*

(Continued)

*Primary Examiner* — Peter C Shaw
(74) *Attorney, Agent, or Firm* — Fenwick & West LLP

(57) ABSTRACT

An enforcement module receives a DNS-based rule of a segmentation policy that controls access of a managed workload to workloads in a DNS domain in which the IP addresses of the workloads associated with a domain name are resolved by a DNS server. When the managed workload makes a connection request to the workload associated with the domain name, the enforcement module snoops on a DNS response from the DNS server to learn the IP address of the workload associated with the domain name. If a domain name of the DNS domain is in a whitelist of domain names permitted by the DNS-based rule, the enforcement module adds the learned IP address to a whitelist of IP addresses and configures a firewall associated with the managed workload to permit connections to the IP addresses in the whitelist.

17 Claims, 4 Drawing Sheets

(56) References Cited

U.S. PATENT DOCUMENTS

| | | | | |
|---|---|---|---|---|
| 2012/0084423 | A1* | 4/2012 | McGleenon | H04L 61/1511 709/223 |
| 2015/0237055 | A1* | 8/2015 | Canoy | H04W 12/088 726/1 |
| 2015/0326530 | A1* | 11/2015 | Wood | G06F 21/554 726/11 |
| 2015/0341318 | A1 | 11/2015 | Lee | |
| 2016/0006693 | A1* | 1/2016 | Salcedo | H04L 63/0414 726/1 |
| 2016/0173439 | A1* | 6/2016 | Kaliski, Jr | H04L 67/28 709/245 |
| 2017/0180421 | A1 | 6/2017 | Shieh et al. | |
| 2017/0230373 | A1* | 8/2017 | Kadur | H04L 61/1511 |
| 2017/0289101 | A1* | 10/2017 | Farag | H04L 61/2046 |
| 2017/0310709 | A1* | 10/2017 | Foxhoven | H04L 61/1511 |
| 2018/0176252 | A1 | 6/2018 | Nimmagadda et al. | |
| 2019/0036930 | A1* | 1/2019 | Bartik | G06F 21/577 |

OTHER PUBLICATIONS

Squarcina et al., "Can I take your Subdomain? Exploring Related-Domain Attacks in the Modern Web", arXiv.org, arXiv:2012.01946, Oct. 16, 2020, pp. 1-19. (Year: 2020).*

Spacek et al., "Current Issues of Malicious Domains Blocking", IEEE, isbn:978-3-903176-15-7, 2019, pp. 551-556. (Year: 2019).*

Squarcina et al., "Can I Take your Subdomain? Exploring Related-Domain Attacks in the Modern Web", arXiv, 2012.01946, Oct. 16, 2020, pp. 1-19. (Year: 2020).*

Špaček et al., "Current Issues of Malicious Domains Blocking," 2019 IFIP/IEEE Symposium on Integrated Network and Service Management (IM), 2019, pp. 551-556. (Year: 2019).*

Holmes, W., "VMware NSX® Micro-segmentation Day 1," Jan. 31, 2017, pp. 1-100, [Online] [Retrieved on Mar. 5, 2020] Retrieved from the Internet <URL: https://www.vmware.com/content/dam/digitalmarketing/vmware/en/pdf/products/nsx/vmware-nsx-microsegmentation.pdf>.

PCT International Search Report and Written Opinion, PCT Application No. PCT/US2020/012099, dated Mar. 25, 2020, 15 pages.

* cited by examiner

DOMAIN NAME BASED VISIBILITY AND POLICY ENFORCEMENT IN A SEGMENTED NETWORK ENVIRONMENT

BACKGROUND

Technical Field

This application relates to enforcing a segmentation policy that controls communications between workloads.

Description of Related Art

A segmentation policy comprises rules that control which workloads may communicate on a network and that restrict how such workloads may communicate. For example, in a large enterprise network, a segmentation policy may be designed to enable a certain group of workloads associated with certain geographic locations, roles, applications or other characteristics to communicate with a limited set of other workloads desirable to facilitate use of certain services, while blocking communications outside the intended use of the services, thereby reducing the likelihood of malicious activity. To enforce the segmentation policy, a segmentation server distributes management instructions to distributed enforcement modules that manage the workloads. The enforcement modules configure respective firewalls controlling traffic to and from the workloads in accordance with the respective management instructions to enforce the segmentation policy in a distributed manner. Conventionally, the enforcement modules configure firewalls using IP lists to identify which workloads are permitted to connect. However, in the case of a rule controlling access to certain types of externally administered workloads (such as those workloads controlled by cloud providers or workloads in on-premise data centers) that provide a managed service accessible via a DNS name, the DNS names can resolve into different IP addresses in different places and at different times. Thus, the particular IP address of a workload associated with a DNS name is often unpredictable and difficult to track. As a result, conventional enforcement techniques are insufficient to control access to such externally provided services.

SUMMARY

A method enforces a segmentation policy. An enforcement module receives from a segmentation server, a management instruction for enforcing a rule of the segmentation policy that permits a connection between a first workload on a host device and a second workload in a network domain identified by a domain name. The enforcement module stores the domain name in a whitelist of domain names. Responsive to a connection request from the first workload to the network domain identified by the domain name, the enforcement module snoops on a DNS response received by the host device to obtain a network address associated with the network domain. Responsive to determining that the domain name associated with the connection request is in a whitelist of domain names, the enforcement module stores, based on the DNS response, the network address associated with the network domain to a whitelist of network addresses. The enforcement module updates a local firewall configuration of a local firewall of the host device based on the whitelist of network addresses to permit the connection between the first workload and the network address associated with the network domain.

In another embodiment, a non-transitory computer-readable storage medium stores instructions that when executed by a processor causes the processor to perform steps according to the method above.

In another embodiment, a computer system includes a processor and a non-transitory computer-readable storage medium stores instructions that when executed by a processor causes the processor to perform steps according to the method above.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

An enforcement module receives a DNS-based rule of a segmentation policy that controls access of a managed workload to workloads in a DNS domain in which the IP addresses of the workloads associated with a domain name are resolved by a DNS server. When the managed workload makes a connection request to the workload in the DNS domain, the enforcement module snoops on a DNS response from the DNS server to learn the IP address of the workload associated with the domain name. If a domain name of the DNS domain is in a whitelist of domain names permitted by the DNS-based rule, the enforcement module adds the learned IP address to a whitelist of IP addresses and configures a firewall associated with the managed workload to permit connections to the IP addresses in the whitelist. The enforcement module furthermore sends the learned mapping between the IP addresses and the domain names to a segmentation server. The segmentation server receives information about traffic flows between workloads as identified by their IP addresses and maps the IP addresses to domain names based on the learned mapping. The segmentation server may then generate a traffic flow graph representing connections between managed workloads and the different DNS domains.

Figure 1:
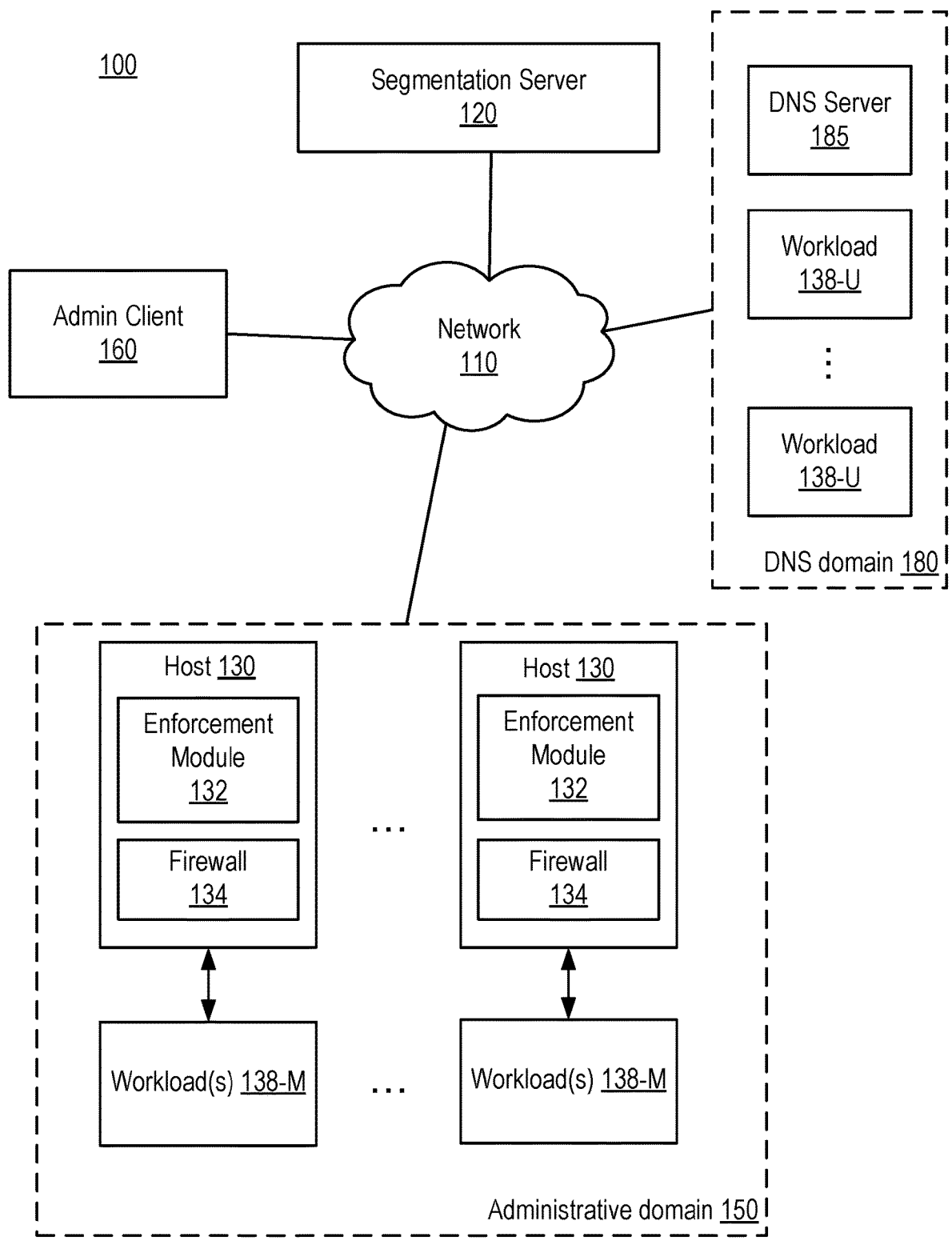
FIG. 1 is a high-level block diagram illustrating an environment for managing a segmentation policy, according to one embodiment.

FIG. 1 is a high-level block diagram illustrating a networked computing environment 100. The networked computing environment 100 includes a segmentation server 120, a network 110, an administrative client 160, an administrative domain 150 that includes one or more managed workloads 138-M each managed by an associated host 130, and a DNS domain 180 including one or more unmanaged workloads 138-U and a DNS server 185. In other embodiments, the administrative domain 150 may additionally include one or more unmanaged workloads 138-U and the DNS domain 180 may include one or more managed workloads 138-M executing on a host 130 in the DNS domain 180. The managed workloads 138-M and the unmanaged workloads 138-U may be collectively referenced herein as workloads 138.

The network 110 represents the communication pathways between the segmentation server 120, the administrative client 160, the entities in the administrative domain 150, and the entities in the DNS domain 180. In one embodiment, the network 110 uses standard communications technologies and/or protocols and can include the Internet. In another embodiment, the entities on the network 110 can use custom and/or dedicated data communications technologies.

The workloads 138 comprise independently addressable computing units for performing computing tasks. A workload 138 may comprise, for example, an application or application component, a process, a container, or other sub-component thereof executing on an operating system instance of an endpoint host, which may comprise a physical computing device or a virtual machine that executes on physical computing device. A single operating system instance may host a single workload 138 or multiple workloads 138 that may be independently addressable and may perform different independent computing functions. The workloads 138 may communicate with other workloads 138 in the networked computing environment 100 to perform various tasks.

The administrative domain 150 can correspond to an enterprise such as, for example, a service provider, a corporation, a university, or a government agency. The administrative domain 150 includes one or more managed workloads 138-M that can be directly controlled by the segmentation policy. Particularly, the administrative domain includes one or more hosts 130 that includes an enforcement module 132 for receiving a segmentation policy from the segmentation server 120 and configuring a firewall 134 to control communications to and from one or more managed workloads 138-M in accordance with the policy.

The hosts 130 may each comprise a physical host device, a virtual machine executing on computer system, or an operating system instance executing on a physical host device or virtual machine capable of hosting the enforcement module 132 and firewall 134. A single physical or virtual machine may operate a single host 130 or may operate multiple hosts 130. A host 130 may comprise an endpoint host that manages one or more managed workloads 138-M on a same operating system instance as the enforcement module 132 and firewall 134. Alternatively, the host 130 may comprise a network host that operates an enforcement module 132 and firewall 134 and manages one or more managed workloads 138-M on a separate endpoint host downstream from the network host. For example, the host 130 can comprise a network firewall, router, or switch that manages one or more downstream managed workloads 138-M.

The firewall 134 monitors and controls incoming and outgoing traffic to and from one or more managed workloads 138-M in accordance with a set of firewall rules. The firewall 134 may comprise, for example, an operating system-level firewall, an Internet Protocol security (IPsec) engine, or a network traffic filtering engine (e.g., based on the Windows Filtering Platform (WFP) development platform). The firewall 134 may be configured in accordance with a table in which each entry specifies a workload identifier (e.g., IP address) of another workload 138 that the workload 138 is permitted to communicate with, a port over which communications are permitted, and a permitted protocol for the communications. The firewall 134 may furthermore operate to block communications that are not expressly permitted in the firewall rules.

The enforcement module 132 receives management instructions from the segmentation server 120 for enforcing the segmentation policy and translates the instructions from a high level of abstraction to low level firewall rules that can be enforced by the firewall 134. The enforcement module 132 then configures the firewall 134 to enforce the segmentation policy. An embodiment of an enforcement module 132 is described in further detail below.

The DNS domain 180 corresponds to an externally administered domain including one or more unmanaged workloads 138-U in which IP addresses of the unmanaged workloads 138-U are resolved by a DNS server 185. The unmanaged workloads 138-U may comprise a cloud server, an on-premise Platform as a Service (PaaS) server, or another server in the DNS domain 180 that makes a service available to one or more managed workloads 138-M. The unmanaged workloads 138-U in the DNS domain 180 are each associated with a domain name of the DNS domain 180. For example, the domain name may comprise a fully qualified domain name (FQDN) that unambiguously identifies the DNS domain 180 within a Domain Name System (DNS) hierarchy. Unlike the managed workloads 138-M in the administrative domain 150, the unmanaged workloads 138-U in the DNS domain 180 are externally managed and the segmentation policy does not directly manage an enforcement module 132 or firewall 134 in the DNS domain 180 to control communications to and from the unmanaged workloads 138-U. However, as will be described below, the segmentation policy can control access of managed workloads 138-M in the administrative domain 150 to the unmanaged workloads 138-U in the DNS domain 180 by appropriately configuring the firewalls 134 of the hosts 130 in the administrative domain 150. In an embodiment, one or more managed workloads 138-M managed by a host 130 may be present in the DNS domain 180 instead of, or in addition to, the unmanaged workloads 138-U. For example, managed workloads 138 embodied as containers may be associated with a domain name and may have IP addresses that are dynamically generated.

The segmentation server 120 is a computer (or set of computers) that obtains and stores information about the workloads 138. The segmentation server 120 manages a segmentation policy for the administrative domain 150 that regulates communications of the workloads 138 in the administrative domain 150 to or from other workloads 138 (which may include managed workloads 138-M or unmanaged workloads 138-U). In an embodiment, the segmentation policy is set forth using permissive rules that specify the communications that are permitted. The segmentation policy is enforced by the hosts 130 blocking communications of workloads 138 in the administrative domain 150 that are not expressly permitted by the rules. For example, the segmentation policy includes a set of rules specifying whether certain workloads 138 in the administrative domain 150 are allowed to provide services or receive services, and may place restrictions on how those workloads 138 are allowed to communicate when providing or consuming the services. For example, a segmentation policy may include a rule specifying that a first managed workload 138-M managed by a first host 130 is allowed to provide a particular service to a second managed workload 138-M managed by a second host 130. The rule may furthermore specify the type of service that the first managed workload 138-M is allowed to provide to second managed workload 138-M (e.g., a database service, a web service, etc.). Additionally, the rule may specify how the first and second managed workloads 138-M may communicate when providing this service (e.g., using encrypted communication only, using authenticated communication only, etc.). Rules may similarly specify whether or not managed workloads 138-M in the administrative domain 150 can access unmanaged workloads 138-U in the DNS domain 180 and may place constraints on those communications. A rule may be specified as a plurality of fields including a "service," a "provided-by" portion that identifies one or more workloads 138 that is permitted to provide the service (which may be specified by a port number), a "used-by" portion that identifies one or more workloads 138 that is permitted to use the service provided by the workloads 138 in the "provided-by portion," and a "rule function" that may place one or more restrictions on the communications between the workloads 138 while facilitating the service. The managed workloads 138-M in the administrative domain are generally blocked from connecting to other workloads 138 absent a rule expressly permitting the connection.

In an embodiment, each workload 138 may belong to one or more workload groups. The workload groups may each be associated with a set of common labels assigned to the workloads 138 in the group. The labels assigned to each workload 138 define one or more high-level characteristics of the workload 138. Labels may be multi-dimensional. Here, a label may comprise a "dimension" (a high-level characteristic) and a "value" (the value of that high-level characteristic). For example, one possible label dimension may specify a "role" of the workload 138 and may have values such as "web," "API," or "database" specifying the role of the workload 138 within the administrative domain 150. In another example, a label dimension may specify a "location" of the workload 138 and may have values such as "United States" or "Europe." Workloads 138 may also be labeled based on a user group of a user that is logged into the workload 138. For example, a workload 138 may have a label with a dimension "user group" and a value "managers." Each workload 138 may be assigned labels for one or more dimensions but each workload 138 does not necessarily have a label assigned for every possible dimension. For example, a workload 138 may have a label specifying its location but may not necessarily have a label specifying its role. The set of labels assigned to a particular workload 138 may be referred to herein as a label set for the workload 138.

A logical management model specifying the number and types of dimensions available and those dimensions' possible values may be configurable. In one embodiment, the logical management model includes the following dimensions and possible values, as shown in Table 1:

TABLE 1

Example of logical management model

| Dimension | Meaning (M), Values (V) |
| --- | --- |
| Role | M: The role of the workload within the administrative domain.<br>V: web, API, database |
| Environment | M: The lifecycle stage of the workload.<br>V: production, staging, development |
| Application | M: The logical application (higher-level grouping of managed servers) to which the workload belongs.<br>V: trading, human resources |
| Line of Business | M: The business unit to which the workload belongs.<br>V: marketing, engineering |
| Location | M: The location of the workload. Can be physical (e.g., country or geographical region) or logical (e.g., network). Physical is particularly useful for expressing geographic compliance requirements.<br>V: US or EU (physical), us-west-1 or us-east-2 (logical) |
| User Group | M: The user group containing the user logged onto the workload.<br>V: Engineers, Contractors, Managers, System Administrators |

The segmentation server 120 may utilize label sets to enable the segmentation policy to be defined at a high level of abstraction by specifying rules based on label sets. Thus, a rule of the segmentation policy may identify a group of workloads 138 to which a portion of the rule is applicable by referencing one or more label sets. For example, a rule may specify that a first group of workloads 138 with a label set A may provide a service B to a second group of workloads 138 with a label set C. Rules may be specified for groups of workloads 138 identified using only a subset of the label dimensions.

The segmentation server 120 may furthermore enable DNS-based rules that identify a group of unmanaged workloads 138-U by referencing a domain name such a fully qualified domain name (FQDN) of the DNS domain 180 associated with the unmanaged workloads 138-U. Thus, for example, a rule may specific that a first group of managed workloads 138-M with a label set A may access a service available from the DNS domain 180 by specifying a domain name for the DNS domain 180 in the rule (e.g., www.domain.com), thereby enabling the first group of managed workloads 138-M to access one or more unmanaged workloads 138-U in the DNS domain 180. Alternatively, a DNS-based rule may reference the domain name using wildcards or other expressions (e.g., www*.domain.com, www.domain.*, *.domain.*, etc.) Here, the wildcard symbol (e.g., *) indicates that any character at that position is treated as matching for the purpose of determining if a particular FQDN is covered by the rule. In further embodiments, the DNS-based rule may specify a domain name and a set of one or more ports associated with the domain name that are permitted for the connection. In an embodiment, a DNS domain 180 may be assigned a label set in the same manner as an individual workload 138 to enable label-based rules to permit access to unmanaged workloads 138-U in the DNS domain 180. In other embodiments, the segmentation server 120 may similarly enable DNS-based rules that apply to workloads 138 in the DNS domain 180 that are not necessarily unmanaged such that access to managed workloads 138 within the DNS domain 180 are similarly controlled by the rule. For example, a DNS-based rule may apply to workloads 138 embodied as containers that provide particular services to managed workloads 138-M and have IP addresses that may be dynamically assigned.

The segmentation server 120 may retain a repository storing information about the hosts 130 and the workloads 138. For example, the segmentation server 120 may store IP addresses for workloads 138 and membership information indicating one or more groups of workloads 138 to which each workload 138 belong (e.g., as defined by the respective label sets for the workloads 138). The repository may furthermore store a mapping between a domain name for a DNS domain 180 and the IP addresses of the unmanaged workloads 138-U in the DNS domain 180. Additionally, the repository may store a mapping between different domain name aliases that reference the same or related DNS domain 180.

The segmentation policy may be enforced in a distributed fashion by the hosts 130. To enable enforcement of the segmentation policy, the segmentation server 120 generates a set of management instructions and distributes the management instructions to the hosts 130. The management instructions include the rules controlling communications between different groups of workloads 138 (e.g., specified by their label sets or directly by an identifier of the workload 138) and membership information indicating workloads 138 belonging to each group (e.g., which workloads 138 have certain label sets). For efficiency of distribution, the segmentation server 120 may send different management instructions to different hosts 130 so that each host 130 gets only the management instructions relevant to its operation. Here, the segmentation server 120 may determine which rules are relevant to a given host 130 and distribute the relevant rules to that host 130. A rule may be deemed relevant to a particular host 130 if that host 130 manages one or more managed workloads 138-M that belongs to a group (defined by one or more label sets) referenced by the rule. The segmentation server 120 may furthermore determine which membership information is relevant to each host 130 and distribute the relevant membership information to each respective host 130. Here, membership information may be relevant to a particular host 130 if it defines membership of a group referenced by a rule deemed relevant to the particular host 130.

Enforcement of rules relating to communications between two managed workloads 138-M may be enforced in a two-sided manner such that that each host 130 enforces the rule for a respective managed workload 138-M that it manages. For example, to enforce a rule permitting communication between a first managed workload 138-M and a second managed workload 138-M, a first management instruction is sent to a first host 130 managing the first managed workload 138-M to permit the first managed workload 138-M to connect to the second managed workload 138-M, and a second management instruction is sent to the second host 130 that manages the second workload 138-M to permit the second managed workload 138-M to connect to the first managed workload 138-M. The enforcement modules 132 of the respective hosts 130 receive the management instructions including the relevant rules and the relevant membership information and translate the management instructions from a high level of abstraction to a low level of abstraction. For example, the enforcement module 132 identifies IP addresses for each of the workloads 138 referenced by the rules, and configures the firewall 134 to enforce the rules.

For rules controlling access of a managed workload 138-M to an unmanaged workload 138-U in the DNS domain 180, the rule may be enforced in a one-sided manner by the host 130 managing the managed workload 138-M. Thus, for example, a rule giving access of a managed workload 138-M to an unmanaged workload 138-U may be implemented by sending a management instruction to the host 130 managing the managed workload 138-M that enables the managed workload 138-M to access the domain name associated with the DNS domain 180 of the unmanaged workload 138-U. Generally, a host 130 will block a managed workload 138-M from accessing an unmanaged workload 138-U in a DNS domain 180 unless expressly permitted by a rule of the segmentation policy.

The administrative client 160 comprises a computing device that may be operated by an administrator of the administrative domain 150 being managed by the segmentation server 120. The administrative client 160 may execute an interface (e.g., via an application or web browser) that enables the administrator to interact with the segmentation server 120 to configure or view the segmentation policy. The interface may furthermore enable the administrator to obtain various information about the hosts 130 and workloads 138 on the network 120 and view traffic flows to and from the workloads 138.

Figure 2:
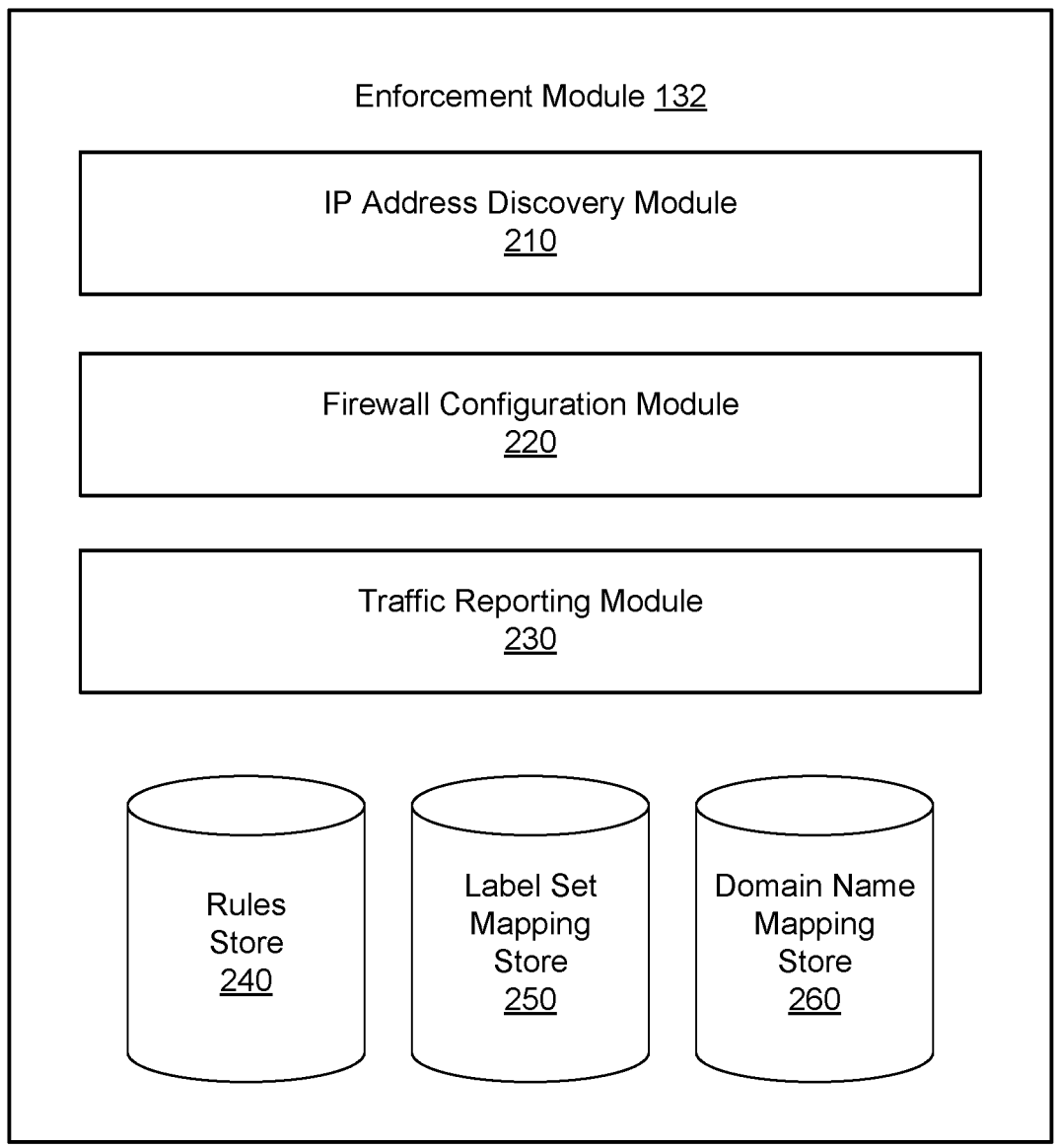
FIG. 2 is a block diagram illustrating example embodiments of an enforcement module.

FIG. 2 illustrates an example embodiment of an enforcement module 132. The enforcement module may comprise an IP address discovery module 210, a firewall configuration module 220, a traffic reporting module 230, a rules store 340, a label set mapping store 250, and a domain name mapping store 260. In alternative embodiments, the enforcement module 132 may comprise different or additional modules.

The rules store 240 stores the set of relevant rules received from the segmentation server 120. For example, a rule may specify a label set representing a group of workloads 138 that a managed workload 138-M managed by the enforcement module 132 is permitted to communicate with and an indication of the ports and protocols over which the communications are permitted. A rule received from the segmentation server 120 may alternatively specify a domain name associated with a workload 138 in a DNS domain 180 that a managed workload 138-M is permitted to communicate with and an indication of the ports and protocols over which the communications are permitted. For the example the rule store 240 may include a white list of domain names to which the managed workload 138-M is permitted connect. In some embodiments, the white list of domain names may be limited to a particular set of ports associated with the domain names.

The label set mapping store 250 stores membership information indicating which specific workloads 138 (referenced by IP addresses) belong to each of the groups of workloads 138 referenced in the relevant rules. For example, the membership information may map a label set to a specific list of IP addresses associated with workloads 138 having the label set.

The domain name mapping store 260 stores a mapping of a domain name such as an FQDN of a DNS domain 180 to one or more IP addresses used by the workloads 138 in the DNS domain 180. The domain name mapping store 260 may furthermore store associations between different domain name aliases in a domain name family associated with the same DNS domain 180. For example, a domain name family may comprise a set of aliases such as www.domain.com, www1.domain.com, www2.domain.com, etc. that reference different servers providing equivalent services.

The IP address discovery module 210 identifies one or more IP addresses associated with a workload 138 in a DNS domain 180 and stores a mapping of the IP addresses to the domain name associated with the DNS domain 180. The IP address associated with a particular domain name may be initially unknown by the enforcement module 132 when a DNS-based rule is first received. When a managed workload 138-M makes an outbound connection request specifying the domain name for the DNS domain 180, the IP address discovery module 210 snoops on the DNS response received from the DNS server 185 in response to the connection request and parses the DNS response to identify an IP address associated of the workload 138 to which the connection is made. The IP address discovery module 210 then stores an association between the IP address and the domain name in the domain name mapping store 260. In an embodiment, the IP address discovery module 210 may utilize Domain Name System Security Extensions (DNSSEC) to authenticate the information (e.g., IP addresses) associated with the domain name before storing it to the domain name mapping store 260. Different connection requests specifying the domain name of the DNS domain 180 at different time may result in different IP addresses being provided by the DNS server 185. Thus, the domain name mapping store 260 may store multiple IP addresses associated with a single domain name and may update the mapping as new IP addresses are learned.

In an embodiment, the IP address discovery module 210 furthermore identifies a time-to-live (TTL) value associated with the IP address in the DNS response and may store the TTL together with the IP address in the domain name mapping store 260. The IP address may be removed from the domain name mapping store 260 that maps IP addresses to the domain names after a time period indicated by the TTL expires.

In an embodiment, the IP address discovery module 210 may furthermore discover and store aliases of domain names associated with connection requests and store the aliases in the domain name mapping store 260. For example, the IP address discovery module 210 may detect a redirect from an initially requested domain name to an alias domain name and store associations between the alias domain names in the domain name mapping store 260. In some embodiment, multiple levels of redirect requests may be detected to identify two or more aliases domain names associated with a particular DNS domain 180.

The firewall configuration module 220 programs the firewall 134 to enforce the segmentation policy. For example, the firewall configuration module 220 may program iptables or other filtering tables that permit connections allowed by the rules while blocking other connections. For a domain name-based rule permitting a connection to unmanaged workloads 138-U in a DNS domain 180 associated with the domain name, the firewall configuration module 220 determines one or more IP addresses associated with the domain name from the domain name mapping store 260 and adds the IP addresses to a whitelist of IP addresses. The firewall configuration module 220 configures the firewall 134 to permit a connection to each of the mapped IP addresses in the whitelist (e.g., by including a firewall rule pointing to an ipset including the IP addresses in the domain name mapping store 260). The firewall configuration module 220 may furthermore limit the permitted connections to specific ports associated with the domain name. The firewall configuration module 220 may furthermore determine aliases of the domain name specified in the domain name-based rule and configure the firewall 134 to permit connections to IP addresses that map to the alias domain name. The firewall configuration module 220 may furthermore configure the firewall 134 to monitor traffic through the firewall 134.

The traffic reporting module 230 tracks the traffic to and from the managed workload 138-M being managed by the enforcement module 132 and sends reports to the segmentation server 120 indicative of the traffic flows. For example, the traffic reporting module 230 may send information (including respective IP addresses) to the segmentation server 120 indicating connections established between the managed workload 138-M being managed by the enforcement module 132 and an external workload 138. The traffic flow reporting module 230 may additionally send information indicating connection attempts that are blocked by the firewall 134. The traffic reporting module 360 may furthermore send information about the discovered mappings between the IP addresses and the domain names in the domain name mapping store 260 and information about discovered aliases of the domain names.

Figure 3:
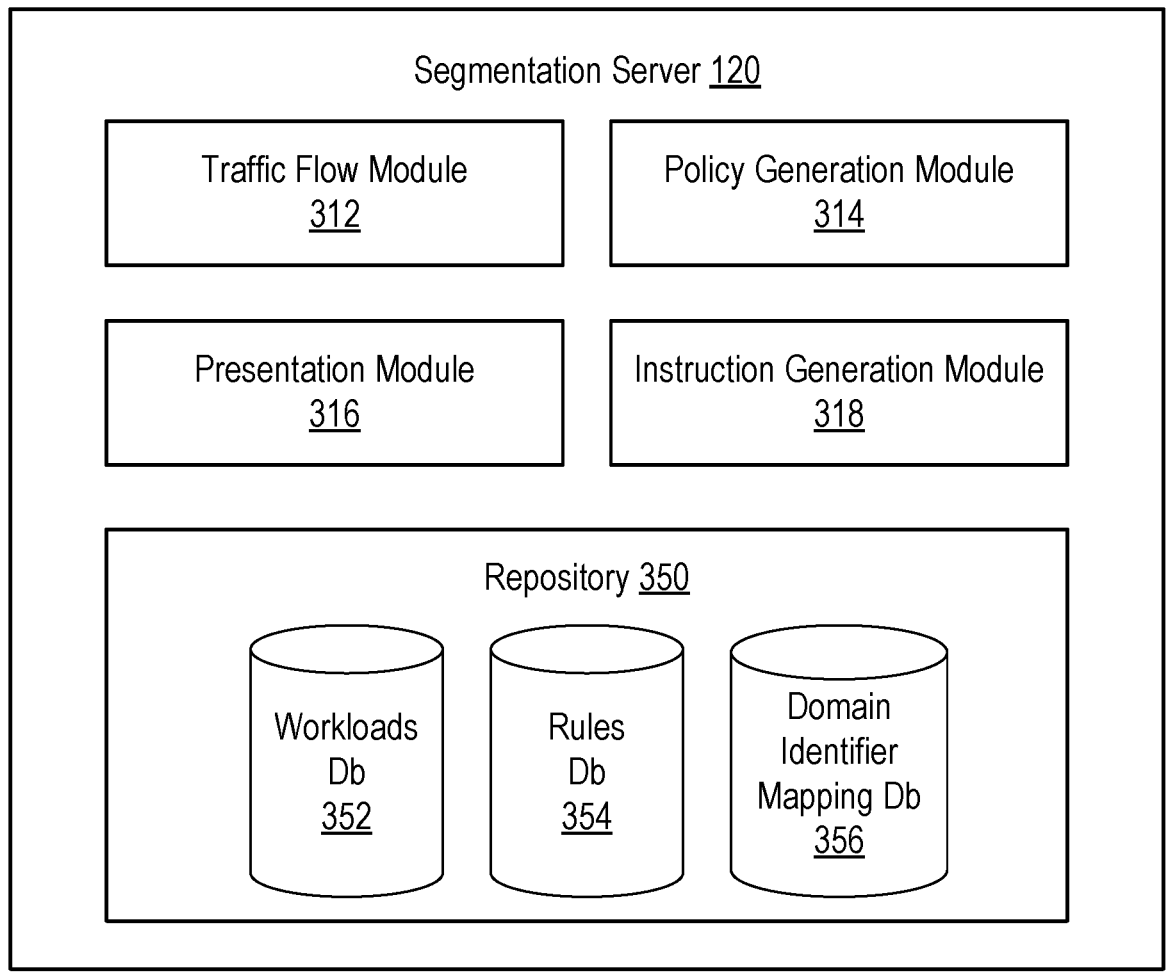
FIG. 3 is a block diagram illustrating an example embodiment of a segmentation server.

FIG. 3 is a high-level block diagram of an embodiment of a segmentation server 120. The segmentation server 120 comprises a traffic flow module 312, a policy generation module 314, a presentation module 316, an instruction generation module 318, and a repository 350. The repository 350 may comprise a workloads database 352 that stores associations between workloads 138 and their respective label sets, a rules database 354 that stores a segmentation policy as a set of rules, and a domain name mapping database 356 that stores associations between discovered IP addresses and a domain name and stores associations between related domain name aliases. In alternative embodiments, the segmentation server 120 may include different or additional components. The various components of the segmentation server 120 may be implemented as one or more processors and a non-transitory computer-readable storage medium that stores instructions executed by the one or more processors to carry out the functions attributed to the segmentation server 120 described herein.

The traffic flow module 312 obtains traffic information relating to traffic flows to and from workloads 138 and presents the traffic information relating to the traffic flows. For each detected traffic flow between a pair of workloads 138, the traffic flow module 312 may identify a direction of the connection, what services are provided or consumed via the connection, what ports are used for the communications, and what protocols are used for the communications. Furthermore, the traffic flow module 312 may identify statistical information relating to the traffic flows such as, for example, a volume of data transferred over each connection, a frequency of communications for the connection, a duration of the connection, or other statistical information indicative of the extent of the communications. The traffic flow module 312 furthermore receives the discovered mappings between a domain name (and its aliases) for DNS domain 180 and the IP addresses associated with the workloads 138 in the DNS domain 180. The discovered mappings are stored to the domain name mapping database 356.

The traffic flow module 312 may generate a representation of the traffic flows in the form of a traffic flow graph in which each workload 138 is represented by a node and traffic flows to and from workloads 138 are represented as edges connecting the respective nodes. The nodes may store information relating to the workloads 138 and the edges may store information relating to the traffic flow including the direction of the connection associated with the traffic flow. In an embodiment, the traffic flow graph may be limited to traffic flows meeting predefined criteria. For example, the traffic flow graph may be limited to traffic flows meeting a predefined threshold volume of the traffic (e.g., amount of data, frequency, duration, or a combination thereof). Thus, pairs of workloads 138 having only very limited or sporadic connections may be omitted from the traffic flow graph.

The traffic flow information received by the traffic flow module 412 generally identifies workloads 138 based on their IP addresses. However, because unmanaged workloads 138-U in a DNS domain 180 may have IP addresses that are unpredictable and may change over time, it is convenient to represent the set of IP addresses associated with a single DNS domain 180 (e.g., associated with a domain name or set of alias domain names) as a single node in the traffic flow graph. Thus, in one embodiment, the traffic flow module 412 identifies, from the domain name mapping database 356, workloads 138 associated with a single domain name and its aliases and represents the set of IP addresses corresponding to the workloads 138 associated with the domain name as a single node in the traffic flow graph.

The policy generation module 314 generates rules of the segmentation policy. The policy generation module 414 may generate the rules based on manual configuration inputs from an administrator or may generate the rules automatically. Under some configuration settings, the rules may be generated based at least in part on the observed traffic flow graph. Particularly, the rule generation module 314 generates a set of rules that permits the traffic flows in the traffic flow graph, without permitting other traffic flows unrelated to the observed traffic flow graph. Assuming that there are no abnormal or malicious communications in the administrative domain 150 in the observed traffic flow graph, the rule generation module 314 will therefore produce a set of rules that permits communications observed during normal operation of the workloads 138 in the administrative domain 150 without permitting abnormal communications that are potentially malicious.

The presentation module 316 interfaces with the administrative client 160 to present a user interface enabling an administrator to manage the administrative domain 150 or a portion thereof. For example, the presentation module 316 may enable an administrator to view a representation of the traffic flows generated by the traffic flow module 312 and generate or modify rules associated with the segmentation policy using the rule generation module 314. For example, the presentation module 316 may generate a graphical interface representing all or a portion of the traffic flow graph with the workloads 138 or DNS domains 180 illustrated as nodes and the traffic flows illustrated as edges connecting relevant nodes. An administrator may select a particular node to view information about the corresponding node (e.g., an identifier for the workload 138, a label set for the workload 138, services provided by or consumed by the workload 139, an FQDN associated with the node, etc.). An administrator may similarly select a particular edge on the graph to view information about the corresponding traffic flow such as, for example, services associated with the traffic flow, ports and protocols associated with the traffic flow, or statistical information associated with the traffic flow.

The instruction generation module 318 generates the management instructions from the rules and distributes the relevant management instructions to the hosts 130 as described above.

Figure 4:
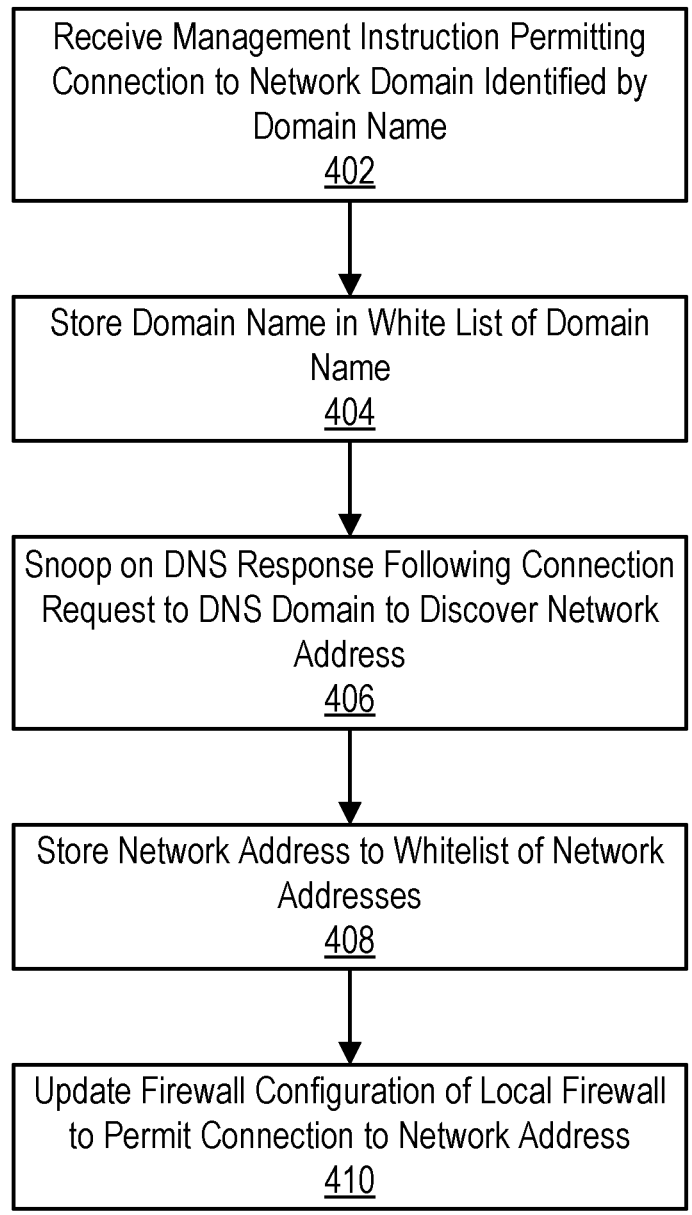
FIG. 4 is a flowchart illustrating an embodiment of a process for enforcing a DNS-based rule of a segmentation policy.

FIG. 4 illustrates an example embodiment of a process for enforcing a segmentation policy using DNS-based rules. An enforcement module 132 receives 402 a management instruction for a DNS-based rule that permits a connection of a workload 138 managed by the enforcement module 132 to a network domain identified by a domain name (e.g., an FQDN). The enforcement module 132 stores 404 the domain name to a whitelist of domain names. The enforcement module 132 snoops 406 on a DNS response received from the DNS server 185 following the connection request to the network domain. For example, the enforcement module 132 parses the DNS response to discover a network address (e.g., an IP address) associated with a workload 138 in the DNS domain 180. The enforcement module 132 stores 408 the network address to a whitelist of network addresses 408 associated with the domain name permitted by the rule. In an embodiment, the information provided in the DNS response may be authenticated using an authentication protocol (e.g., DNSSEC). The enforcement module 132 then update a firewall configuration of the firewall 134 to permit the connection to the network address.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method for enforcing a segmentation policy that controls permissibility of connections between workloads in a networked computer environment, the method comprising:
    receiving, at an enforcement module from a segmentation server over a network, a management instruction for configuring a local firewall of a host device to enforce a rule of the segmentation policy, the management instruction identifying a first workload on the host device and a domain name, and the management instruction indicating permissibility of a connection between the first workload on the host device and a second workload in a network domain identified by the domain name;

storing, by the enforcement module, the domain name in a whitelist of domain names;

responsive to a connection request from the first workload to the network domain identified by the domain name, detecting a redirect from the domain name to an alias name and snooping, by the enforcement module, on a DNS response received by the host device in response to the redirect to the alias name to obtain a network address associated with the network domain;

storing, by the enforcement module based on the DNS response, the network address associated with the network domain to a whitelist of network addresses;

updating, by the enforcement module, an access control rule of the local firewall of the host device based on the whitelist of network addresses to permit the connection between the first workload and the network address associated with the network domain;

reporting, to the segmentation server by the enforcement module over the network, a mapping between the network address and the network domain identified from the DNS response;

monitoring, by the enforcement module, the local firewall to detect a traffic flow between the first workload and the network address associated with the network domain; and responsive to detecting the traffic flow, reporting by the enforcement module to the segmentation server over the network, the traffic flow between the first workload and the network address to enable the segmentation server to generate a traffic flow graph based on the traffic flow between the first workload and the network address and the mapping between the network address and the network domain.

2. The method of claim 1, further comprising:
storing a time-to-live value in association with the network address; and
responsive to the time-to-live value expiring, removing the network address from the whitelist of network addresses.

3. The method of claim 1, wherein reporting the mapping between the network address and the network domain comprises reporting an association of the alias name with the domain name.

4. The method of claim 1,
wherein storing the domain name to the whitelist of domain names further comprises storing one or more port numbers in association with the domain name; and
wherein updating the access control rule comprises:
determining that a port number associated with the connection request is included in the one or more port numbers associated with the domain name; and
permitting the connection with the port number associated with the connection request.

5. The method of claim 1, wherein the rule of the segmentation policy identifies the domain name based on an expression including one or more wildcard characters.

6. The method of claim 1, further comprising authenticating the domain name based on domain name system security extensions (DNSSEC).

7. The non-transitory computer-readable storage medium of claim 1, wherein reporting the mapping between the network address and the network domain comprises reporting an association of the alias name with the domain name.

8. A non-transitory computer-readable storage medium storing instructions for enforcing a segmentation policy that controls permissibility of connections between workloads in a networked computer environment, the instructions when executed by a processor causing the processor to perform steps including:

receiving, at an enforcement module from a segmentation server over a network, a management instruction for configuring a local firewall of a host device to enforce a rule of the segmentation policy, the management instruction identifying a first workload on the host device and a domain name, and the management instruction indicating permissibility of a connection between the first workload on the host device and a second workload in a network domain identified by the domain name;

storing, by the enforcement module, the domain name in a whitelist of domain names;

responsive to a connection request from the first workload to the network domain identified by the domain name, detecting a redirect from the domain name to an alias name and snooping, by the enforcement module, on a DNS response received by the host device in response to the redirect to the alias name to obtain a network address associated with the network domain;

storing, by the enforcement module based on the DNS response, the network address associated with the network domain to a whitelist of network addresses;

updating, by the enforcement module, an access control rule of the local firewall of the host device based on the whitelist of network addresses to permit the connection between the first workload and the network address associated with the network domain;

reporting, to the segmentation server by the enforcement module over the network, a mapping between the network address and the network domain identified from the DNS response;

monitoring, by the enforcement module, the local firewall to detect a traffic flow between the first workload and the network address associated with the network domain; and responsive to detecting the traffic flow, reporting by the enforcement module to the segmentation server over the network, the traffic flow between the first workload and the network address to enable the segmentation server to generate a traffic flow graph based on the traffic flow between the first workload and the network address and the mapping between the network address and the network domain.

9. The non-transitory computer-readable storage medium of claim 8, wherein the instructions when executed by the processor further cause the processor to perform steps including:
storing a time-to-live value in association with the network address; and
responsive to the time-to-live value expiring, removing the network address from the whitelist of network addresses.

10. The non-transitory computer-readable storage medium of claim 8,
wherein storing the domain name to the whitelist of domain names further comprises storing one or more port numbers in association with the domain name; and wherein updating the access control rule comprises:
  determining that a port number associated with the connection request is included in the one or more port numbers associated with the domain name; and
  permitting the connection with the port number associated with the connection request.

11. The non-transitory computer-readable storage medium of claim 8, wherein the rule of the segmentation policy identifies the domain name based on an expression including one or more wildcard characters.

12. The non-transitory computer-readable storage medium of claim 8, wherein the instructions when executed by the processor further cause the processor to perform steps including authenticating the domain name based on domain name system security extensions (DNSSEC).

13. A computer system comprising:
  a processor; and
  a non-transitory computer-readable storage medium storing instructions for enforcing a segmentation policy that controls permissibility of connections between workloads in a networked computer environment, the instructions when executed by the processor causing the processor to perform steps including:
  receiving, at an enforcement module from a segmentation server over a network, a management instruction for configuring a local firewall of a host device to enforce a rule of the segmentation policy, the management instruction identifying a first workload on the host device and a domain name, and the management instruction indicating permissibility of a connection between the first workload on the host device and a second workload in a network domain identified by the domain name;
  storing, by the enforcement module, the domain name in a whitelist of domain names;
  responsive to a connection request from the first workload to the network domain identified by the domain name, detecting a redirect from the domain name to an alias name and snooping, by the enforcement module, on a DNS response received by the host device in response to the redirect to the alias name to obtain a network address associated with the network domain;
  storing, by the enforcement module based on the DNS response, the network address associated with the network domain to a whitelist of network addresses;
  updating, by the enforcement module, an access control rule of the local firewall of the host device based on the whitelist of network addresses to permit the connection between the first workload and the network address associated with the network domain;
  reporting, to the segmentation server by the enforcement module over the network, a mapping between the network address and the network domain identified from the DNS response;
  monitoring, by the enforcement module, the local firewall to detect a traffic flow between the first workload and the network address associated with the network domain; and
  responsive to detecting the traffic flow, reporting by the enforcement module to the segmentation server over the network, the traffic flow between the first workload and the network address to enable the segmentation server to generate a traffic flow graph based on the traffic flow between the first workload and the network address and the mapping between the network address and the network domain.

14. The computer system of claim 13, wherein the instructions when executed by the processor further cause the processor to perform steps including:
  storing a time-to-live value in association with the network address; and
  responsive to the time-to-live value expiring, removing the network address from the whitelist of network addresses.

15. The computer system of claim 13,
  wherein storing the domain name to the whitelist of domain names further comprises storing one or more port numbers in association with the domain name; and
  wherein updating the access control rule comprises:
  determining that a port number associated with the connection request is included in the one or more port numbers associated with the domain name; and
  permitting the connection with the port number associated with the connection request.

16. The computer system of claim 13, wherein the rule of the segmentation policy identifies the domain name based on an expression including one or more wildcard characters.

17. The computer system of claim 13, wherein the instructions when executed by the processor further cause the processor to perform steps including authenticating the domain name based on domain name system security extensions (DNSSEC).

* * * * *